United States Patent
Mundarath et al.

(10) Patent No.: US 9,172,444 B2
(45) Date of Patent: Oct. 27, 2015

(54) METHODS FOR OPPORTUNISTIC MULTI-USER BEAMFORMING IN COLLABORATIVE MIMO-SDMA

(75) Inventors: Jayakrishnan C. Mundarath, Austin, TX (US); Jayesh H. Kotecha, Austin, TX (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/311,399

(22) Filed: Dec. 5, 2011

(65) Prior Publication Data
US 2012/0076033 A1   Mar. 29, 2012

Related U.S. Application Data

(63) Continuation of application No. 11/535,679, filed on Sep. 27, 2006, now Pat. No. 8,073,486.

(51) Int. Cl.
*H04M 1/00*  (2006.01)
*H04B 7/04*  (2006.01)
*H04W 16/28* (2009.01)

(52) U.S. Cl.
CPC .............. *H04B 7/043* (2013.01); *H04B 7/0417* (2013.01); *H04W 16/28* (2013.01)

(58) Field of Classification Search
CPC .. H04B 7/0413; H04B 7/0417; H04B 7/0456; H04B 7/0617; H04B 7/0452; H04B 7/0626; H04B 7/0639; H04B 7/0634; H04B 7/0842; H04B 7/061; H04B 7/0615; H04B 7/0619; H04B 1/712; H04B 7/0891
USPC .......... 370/334, 335; 375/267, 260, 262, 148, 375/E1.032, 144; 455/553.1, 101, 103, 455/63.4, 562.1, 115.1, 129, 272; 342/154, 342/174, 368
See application file for complete search history.

(56) References Cited

U.S. PATENT DOCUMENTS 6,473,467 B1   10/2002   Wallace et al.
6,968,092 B1   11/2005   Winger et al.
(Continued)

OTHER PUBLICATIONS

A Bourdoux et al., "Joint TX-RX Optimisation for MIMO-SDMA Based on a Null-space Constraint." IEEE Vehicular Technology Conference, vol. 1, 2002.
(Continued)

*Primary Examiner* — Fred Casca
(74) *Attorney, Agent, or Firm* — Meyertons, Hood, Kivlin, Kowert & Goetzel, P.C.

(57) ABSTRACT

A system and method for opportunistically designing collaborative beamforming vectors is disclosed for a wireless multiple input, multiple output (MIMO) space division multiple access (SDMA) communication system by sequentially designing beamforming vectors for ranked channels in order to exploit the instantaneous channel conditions to improve per user average SNR performance. Each subscriber station independently transmits information to a base station that allows the base station to determine beamforming vectors for each subscriber station by ranking the subscriber stations by channel strength. Using sequential nullspace methods, the ranked channel matrices are then used to select the channel matrix $H_i$ for the best subscriber station, to design the $w_i$, $v_i$ for the best subscriber station as the left and right singular vectors of the MIMO channel matrix $H_i$, to transform the remaining channels and to continue the process until beamforming vectors are designed for all channels.

10 Claims, 6 Drawing Sheets

(56) References Cited

U.S. PATENT DOCUMENTS

| | | |
|---|---|---|
| 7,110,463 B2 | 9/2006 | Wallace et al. |
| 7,151,809 B2 | 12/2006 | Ketchum et al. |
| 7,505,527 B2 | 3/2009 | Hwang |
| 7,602,837 B2 | 10/2009 | Kotecha et al. |
| 7,702,029 B2 | 4/2010 | Kotecha et al. |
| 7,813,455 B2 | 10/2010 | Kotecha |
| 2002/0051430 A1* | 5/2002 | Kasami et al. ............ 370/319 |
| 2003/0038748 A1* | 2/2003 | Henderson et al. ........ 342/373 |
| 2004/0066761 A1 | 4/2004 | Giannakis |
| 2004/0076224 A1 | 4/2004 | Onggosanusi et al. |
| 2005/0009476 A1 | 1/2005 | Wu et al. |
| 2005/0043031 A1 | 2/2005 | Cho et al. |
| 2005/0129137 A1 | 6/2005 | Yamada et al. |
| 2005/0157807 A1* | 7/2005 | Shim et al. ............... 375/267 |
| 2005/0201296 A1 | 9/2005 | Vannithamby et al. |
| 2006/0039493 A1* | 2/2006 | Mukkavilli et al. ........ 375/267 |
| 2006/0092054 A1 | 5/2006 | Li et al. |
| 2006/0093065 A1 | 5/2006 | Thomas et al. |
| 2006/0121946 A1 | 6/2006 | Walton et al. |
| 2007/0015543 A1* | 1/2007 | Ojard ....................... 455/562.1 |
| 2007/0066230 A1* | 3/2007 | Zhang et al. ............. 455/67.11 |
| 2007/0071147 A1* | 3/2007 | Sampath et al. ............ 375/347 |
| 2007/0099571 A1 | 5/2007 | Withers et al. |
| 2007/0127608 A1 | 6/2007 | Scheim et al. |
| 2007/0147535 A1 | 6/2007 | Niu |
| 2007/0249296 A1 | 10/2007 | Howard et al. |
| 2007/0297528 A1 | 12/2007 | Feder |
| 2008/0056414 A1 | 3/2008 | Kim et al. |
| 2008/0076370 A1 | 3/2008 | Kotecha et al. |
| 2008/0080449 A1 | 4/2008 | Huang et al. |
| 2008/0080459 A1 | 4/2008 | Kotecha et al. |
| 2009/0190688 A1 | 7/2009 | Kotecha et al. |

OTHER PUBLICATIONS

K. Wong et al., "Performance Enhancement of Multiuser MIMO Wireless Communication Systems," IEEE Transactions on Communications, vol. 50, No. 12, Dec. 2002.

Wei et al., "Tackling MIMO-OFDMA Feedback Load Through Feedback Encoding," IEEE Wireless Communication Systems, pp. 363-367 (Sep. 6-8, 2009).

Kim et al., U.S. Appl. No. 60/841,246, filed Aug. 31, 2006.

* cited by examiner

METHODS FOR OPPORTUNISTIC MULTI-USER BEAMFORMING IN COLLABORATIVE MIMO-SDMA

PRIORITY AND RELATED APPLICATIONS

This application is a continuation of and claim priority to co-owned co-pending U.S. patent application Ser. No. 11/535,679 of the same title filed Sep. 27, 2006, the foregoing incorporated herein by reference in its entirety.

BACKGROUND OF THE INVENTION

1. Field of the Invention

The present invention is directed in general to field of information processing. In one aspect, the present invention relates to a system and method for beamforming for collaborative, space division multiple access systems with transmitter and receiver antenna arrays.

2. Description of the Related Art

The demand for wireless communication systems continues to expand. Wireless communication systems transmit and receive signals within a designated electromagnetic frequency spectrum. The capacity of the electromagnetic frequency spectrum is limited. Thus, the usage expansion of wireless communication systems continually introduces challenges to improve spectrum usage efficiency. Space division multiple access (SDMA) represents one approach to improving spectrum usage efficiency. SDMA has recently emerged as a popular technique for the next generation communication systems. SDMA based methods have been adopted in several current emerging standards such as IEEE 802.16 and the 3rd Generation Partnership Project (3GPP).

Figure 1:
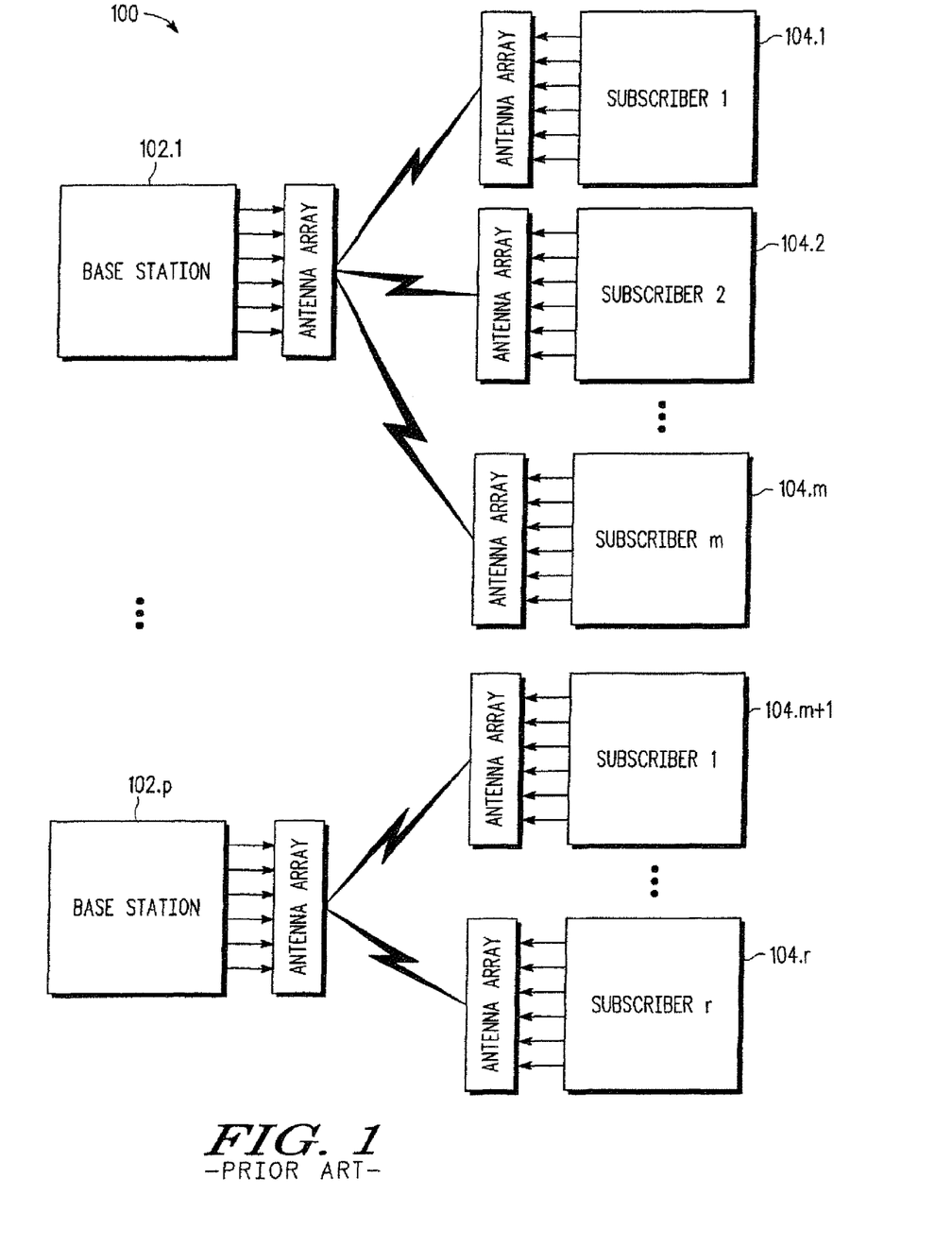
FIG. 1 (labeled prior art) depicts a wireless communication system that employs SDMA.

FIG. 1 depicts a wireless communication system 100 that employs SDMA. The communication system 100 is a multiple-input multiple-output (MIMO) system. In MIMO systems, transmitters and receivers are both equipped with multiple antennas. The wireless communication system 100 includes multiple base stations 102.1-102.$p$ and multiple subscriber stations 104.1-104.$r$, where "p" and "r" are integers representing the number of base stations and subscriber stations, respectively, in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In an SDMA-MIMO wireless communication system, each base station 102 and subscriber station 104 includes an array of antennas for transmitting and receiving signals. In SDMA, different subscriber stations share the same time-frequency channel and the separation between them occurs in the spatial dimension. During transmission, the antenna array forms a beam or multiple beams by applying a set of weights to signals applied to each antenna in the antenna array. A different set of beam forming weights is applied to communications between the base station and each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink.

Figure 2:
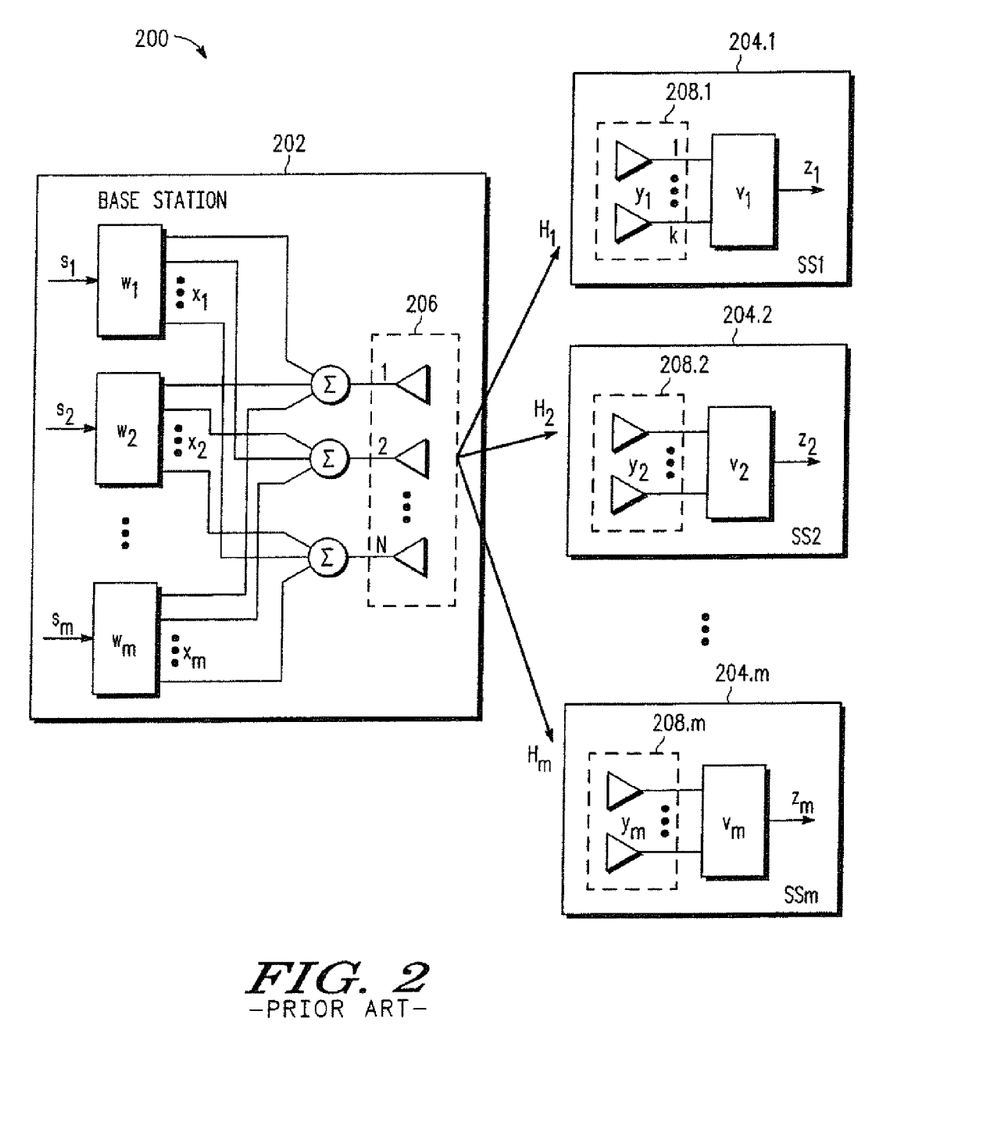
FIG. 2 (labeled prior art) depicts a base station and subscriber stations in an SDMA-MIMO wireless communication system.

FIG. 2 depicts base station 202 and subscriber stations 204.1 through 204.$m$ in an SDMA-MIMO wireless communication system. Base station 202 represents each of base stations 102.1 through 102.$p$, and subscriber stations 204.1 through 204.$m$ represent any group of m subscriber stations. MIMO systems use beamforming to transmit a single data stream through multiple antennas, and the receiver combines the received signal from the multiple receive antennas to reconstruct the transmitted data. As described in greater detail below, "beamforming" processes a signal for transmission using weight vector $w_i$ and an array of antennas to direct the signal using interference properties, and at the receiver, the received signals detected by the array of antennas are processed using a combining vector $v_i$.

Base station 202 has an array of N antennas 206, where N is an integer greater than or equal to m. The base station prepares a transmission signal, represented by the vector $x_i$, for each signal $s_i$, where $i \in \{1, 2, \ldots, m\}$ (Note: lower case bold variables indicate vectors and upper case BOLD variables indicate matrices). The transmission signal vector $x_i$ is determined in accordance with Equation [1]:

$$x_i = w_i \cdot s_i \quad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 206, where $j \in \{1, 2, \ldots, k_i\}$, and $k_i$ represents the number of receiving antennas of the $i^{th}$ subscriber station 204.$i$. In addition, the term "$s_i$" is the data to be transmitted to the $i^{th}$ receiver. Each of the coefficients of weight vector $w_i$ may be a complex weight. Unless otherwise indicated, transmission beamforming vectors are referred to as "weight vectors," and reception vectors are referred to as "combining vectors".

The transmission signal vector $x_i$ is transmitted via a channel represented by a channel matrix $H_i$. The channel matrix $H_i$ represents a channel gain between the transmitter antenna array 206 and the subscriber station antenna array 208.$i$. Thus, the channel matrix $H_i$ can be represented by a N×$K_i$ matrix of complex coefficients, where N is the number of antennas at the base station antenna array 206 and $k_i$ is the number of antennas in the $i^{th}$ subscriber station antenna array 208.$i$. The value of $k_i$ can be unique for each subscriber station. As will be appreciated, the channel matrix $H_i$ can instead be represented by a $k_i$×N matrix of complex coefficients, in which case the matrix manipulation algorithms are adjusted accordingly so that, for example, the right singular vector calculation on a N×$k_i$ channel matrix becomes a left singular vector calculation on a $k_i$×N channel matrix. The coefficients of the channel matrix $H_i$ depend, at least in part, on the transmission characteristics of the medium, such as air, through which a signal is transmitted. A variety of methods may be used to determine the channel matrix $H_i$ coefficients, such as transmitting a known pilot signal to a receiver so that the receiver, knowing the pilot signal, can estimate the coefficients of the channel matrix $H_i$ using well-known pilot estimation techniques. Alternatively, the actual channel matrix $H_i$ is known to the receiver and may also be known to the transmitter.

At the subscriber station 204.i, the transmitted signals are received on the $k_i$ receive antennas. The received signals for the $i^{th}$ subscriber station 204.i are represented by a $k_i \times 1$ received signal vector $y_i$ in accordance with Equation [2]:

$$y_i = s_i H_i^H w_i + \left( \sum_{n=1}^{m} s_n H_i^H w_n - s_i H_i^H w_i \right) \quad [2]$$

where "$s_i$" is the data to be transmitted to the $i^{th}$ subscriber station 204.i, "$s_n$" is the data transmitted to the $n^{th}$ subscriber station 204.n, "$H_i^H$" represents the complex conjugate of the channel matrix correlating the base station 202 and $i^{th}$ subscriber station 204.i, $w_i$ is the $i^{th}$ base station weight vector, and $w_n$ is the $n^{th}$ base station weight vector. The superscript "H" is used herein as a hermitian operator to represent a complex conjugate operator. The $j^{th}$ element of the received signal vector $y_i$ represents the signal received on the $j^{th}$ antenna of subscriber station 204.i, $j \in \{1, 2, \ldots, k_i\}$. The first term on the right hand side of Equation [2] is the desired receive signal while the summation terms less the desired receive signal represent co-channel interference.

To obtain a data signal, $z_i$, which is an estimate of the transmitted data $s_i$, the subscriber station 204.i combines the signals received on the k antennas using a combining vector $v_i$ in accordance with Equation [3]:

$$z_i = \hat{s}_i = v_i^H y_i \quad [3].$$

In the context of the foregoing, MIMO-SDMA communication methods can be classified into two major categories: (1) collaborative and (2) non-collaborative. Collaborative MIMO-SDMA methods entail all schemes where the weighting vectors $w_i$ and combining vectors $v_i$ of base station 202 and subscriber station 204.i are designed together in a collaborative fashion. In collaborative MIMO-SDMA, each subscriber stations feeds back the downlink MIMO channel matrix to the base station, and the base station uses the knowledge of MIMO channels to all the subscriber stations 204.1-$m$ to jointly design the weighting and combining vectors for the base station 202 and each subscriber station 204.1-$m$. The combining vectors are then conveyed to each subscriber station, and the communication proceeds with the base station simultaneously transmitting m data packets to each subscriber using their respective transmit weight vectors while each receiver decodes their respective packet using their respective receive weight vector. In contrast, non-collaborative systems employ a sequential design approach so that, for example, the base station 202 (or the subscriber stations 204) designs its weighting vector (or combining vector) first, and then the knowledge of the designed vectors is used to design the remaining set of vectors.

The signal throughput capacity of collaborative SDMA systems is conventionally greater than the capacity of non-collaborative systems since collaborative systems benefit from the joint knowledge of the channels $H_i$, $i \in \{1, 2, \ldots, m\}$, to all the subscriber stations 204.1-$m$, while a combining vector for one subscriber station 204.i in the non-collaborative systems is determined independently of the other subscriber stations 204. While the joint knowledge of the channel conditions is typically collected at the base station 202 through feedback from each subscriber station 204i, collaborative SDMA systems typically use this channel condition information to design the weight and combining vectors with the goal of reducing interference between receiving stations. On the other hand, the performance of collaborative systems can be impaired by the overhead associated with the feedback of channel estimate information and the feed forward of combining vector information, in contrast with non-collaborative system which have lower overhead requirements. Thus, conventional approaches result in the design of weight and combining vectors which do not maximize the average signal-to-noise ratio (SNR) for a receiver station that is allowed for a given channel condition. In addition, conventional approaches do not provide flexibility in terms of trading off computational requirements or the size of control information exchanged with performance. Moreover, conventional approaches require significant control information to be fed back and fed forward, thereby impairing system performance.

Accordingly, there is a need for an improved methodology for designing optimal beamforming weight vectors and combining vectors in a collaborative system. There is also a need for a collaborative MIMO-SDMA system which jointly designs the weight and combining vectors to improve the per user average SNR performance. In addition, there is a need for a family of signal processing algorithms for selecting transmit and receive array vectors for MIMO-SDMA which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A wireless MIMO-SDMA methodology and system are described for jointly designing beamforming weighting and combining vectors that exploit instantaneous channel information in an opportunistic manner to produce signals having a higher per user average signal-to-noise ratio (SNR) or signal-to-interference-plus-noise ratio (SINR). Using the assembled MIMO channel information (e.g., channel matrix $H_i$) for all the subscriber stations, the base station uses a collaborative framework to design the subscriber station receive combining vector $v_1$ and the base station transmit weighting vector $w_i$ so as to exploit the instantaneous channel conditions to improve per user average SNR performance. In at least one embodiment, the base station jointly designs the beamforming vectors $(v_1, \ldots, v_m; w_1, \ldots, w_m)$ for the "best" subscriber station first (e.g., the subscriber station with the channel matrix having the largest left singular value), and then for the next "best" subscriber station, and so on. With this approach, the opportunistically designed beamforming vectors exploit the fact that each subscriber station moves among strong and weak channel conditions, resulting in a net improvement in system performance. A first design algorithm (which may be referred to as the full nullspace method) may be used when the number of subscriber stations "m" is less than or equal to the number of antennas "$k_i$" at each subscriber station. In other words, $m \leq \min_{i=1, 2, \ldots, m} k_i$. In an example embodiment, the first design algorithm ranks the assembled MIMO channel information based on the computed singular values of the $H_i$, $\lambda_i$ pair (where $\lambda_i$ is the maximal eigenvalue of the matrix $H_i$) and uses the ranking to select a subscriber station k. Next, the weighting and combining beamformers $w_k$, $v_k$ for subscriber station k are designed as the left and right singular vectors of the MIMO channel matrix $H_k$ corresponding to its largest singular value. In particular, the weighting vector $w_k$ for the selected subscriber station k is derived from or is generated to be substantially equivalent to a left singular vector corresponding to the maximum singular value of the channel matrix between the base station and the selected subscriber station k (e.g., $w_k = LSV_{max}(H_k)$), while the combining vector $v_k$ for the selected subscriber station k is derived from or is generated to be substantially equivalent to a right singular vector corresponding to the maximum singular value of the channel matrix between the base station and the selected subscriber station k (e.g., $v_k = RSV_{max}(H_k)$). The beamformers to the rest of the subscriber stations are developed to be in the nullspace corresponding to the beamformers $w_k$, $v_k$ to subscriber station k by projecting the channels to each of the remaining subscriber stations onto the nullspace of subscriber station k. The same process as above is repeated for the remaining subscriber stations until vectors have been computed for all subscriber stations.

In other embodiments, the base station jointly designs the vectors $(v_1, \ldots, v_m; w_1, \ldots, w_m)$ using a second design algorithm (which may be referred to as the nullspace-subspace method) if the number of subscriber stations "m" is greater than the number of antennas "k" at each subscriber station. In other words, one or more of the subscriber stations has fewer than m antennas. In an example embodiment, the second design algorithm ranks the assembled MIMO channel information based on the computed singular values of the $H_i$, $\lambda_i$ pair (where $\lambda_i$ is the maximal eigenvalue of the (remaining) matrix $H_i$) and uses the $\lambda_i$ values to rank and divide the $\lambda_i$ values into two sets, the primary set P and the secondary set S. For each subscriber station k in the secondary set S (which corresponds to the lowest ranked $\lambda_i$ values), the combining vector $v_k$ for the selected subscriber station k is derived from or is generated to be substantially equivalent to a right singular vector corresponding to the maximum singular value of the channel matrix between the base station and the selected subscriber station k (e.g., $v_k = RSV_{max}(H_k)$). The computed combining vector $v_k$ is used to compute the transformed channels for the subscriber stations in the primary set P (which corresponds to the highest ranked $\lambda_i$ values). This may accomplished by projecting the channels of all users in the primary set P onto the null space corresponding to the combining vectors of subscriber stations in the secondary set S. Next, the first design algorithm (described above) is used to compute the vectors $w_i$, $v_i$ for subscriber stations in the primary set P. And after transforming the secondary channels, the weighting vector $w_k$ for each subscriber station k in the secondary set S (which corresponds to the lowest ranked $\lambda_i$ values) is computed.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 3:
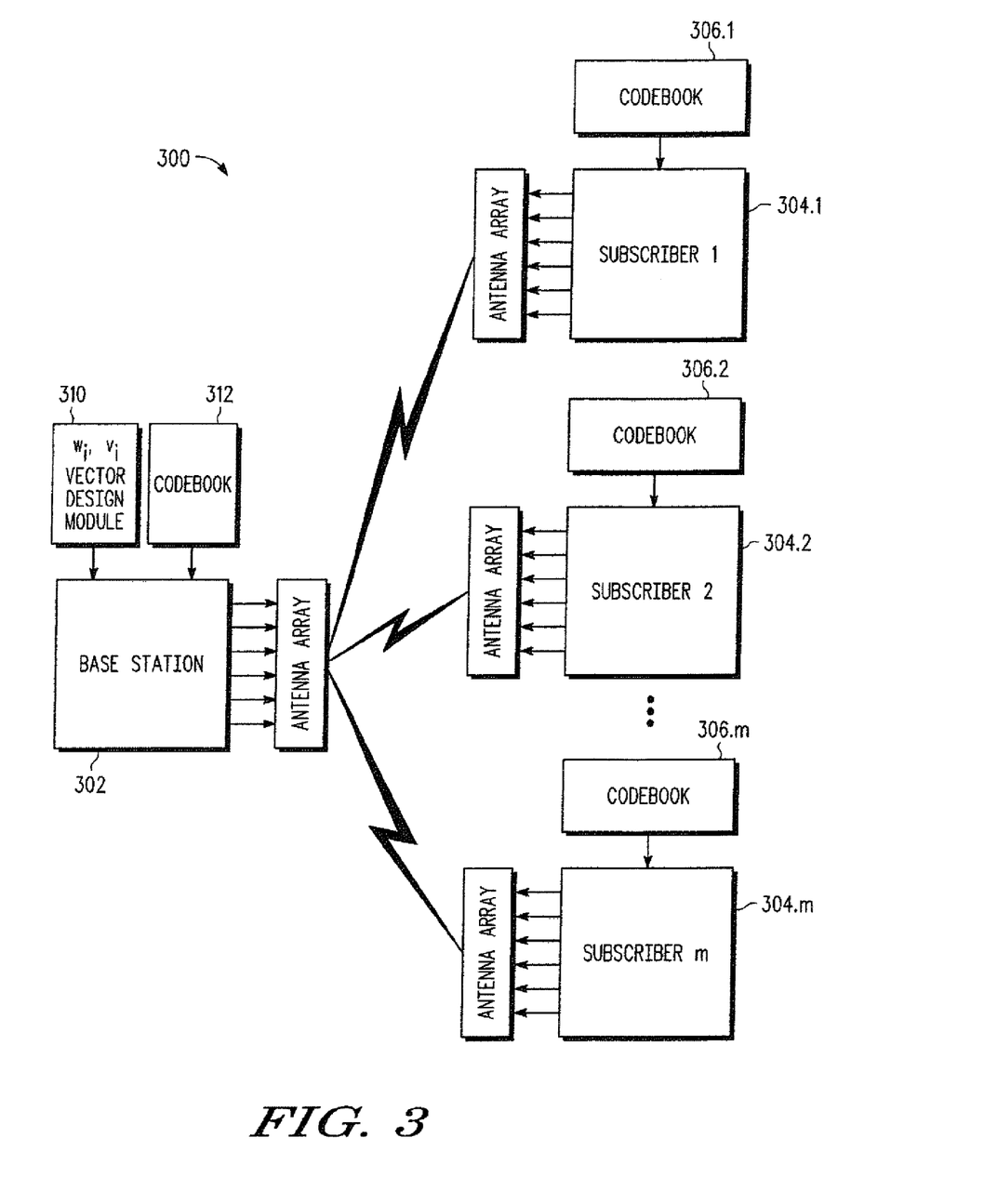
FIG. 3 depicts a wireless communication system with a base station and subscriber stations.

FIG. 3 depicts a wireless communication system 300 with a base station 302 and in subscriber stations 304.1 through 304.m. The wireless communication system 300 is a collaborative MIMO-SDMA system. Thus, each base station 302 includes an array of multiple antennas for communicating with the subscriber stations 304.1 through 304.m, and each subscriber station includes respective antenna arrays for communicating with the base station 302. The number of antennas in the antenna arrays is station dependent. During transmission, the base station 302 may include at least as many antennas as the number of subscriber stations, though there could be more subscribers in the system, such as in situations where the base station only transmits to a number of subscribers that is less than or equal to its antennas at any given time. In accordance with various illustrative embodiments of the collaborative wireless communication system 300, the base station 302 includes a vector design module 310 which is used to jointly design the vectors for each subscriber station $(v_1, \ldots, v_m; w_1, \ldots, w_m)$ to make best use of the existing channel conditions for individual subscriber stations. In addition, each station may include a codebook (such as a base station codebook 312 or subscriber station 306.i) for use in efficiently transferring information in either the feedback and feedforward channel, as described herein below.

In operation, each subscriber station 302.1-m determines its MIMO channel matrix $H_i$—which specifies the transmission channel gain between a transmitter and an $i^{th}$ receiver—and transmits channel-related information to the base station 302. For example, in a MIMO implementation, each subscriber station 304.1-m determines its MIMO channel matrix $H_i$—which specifies the transmission channel gain between a transmitter and an $i^{th}$ receiver—such as by using pilot estimation or sounding techniques to determine or estimate the coefficients of the channel matrix $H_i$. Rather than feeding back the entire vector or matrix representation of the transmission channel (which would require a large number of bits), the channel matrix information may be compressed or quantized by using a codebook (e.g., 306.1) at the subscriber station (e.g., 304.1). The codebook (e.g. 306.1) at the subscriber station (e.g. 304.1) may be used to store an indexed set of possible matrices $H_i$ so that, instead of transmitting the complete matrix information $H_i$, the subscriber station 304.1 retrieves the corresponding index from the codebook 306.1 and feeds back the index to the base station 302 over a low rate feedback channel which uses the index to access the corresponding matrix $H_i$ information from the base station codebook 312. Alternatively, the base station 302 can estimate the channel matrix $H_i$ for each subscriber station 302.1-m, such as by using estimation mechanisms, such as sounding. In other embodiments, the channel matrices used for transmitting and receiving are different (e.g. $H_{iT}$ and $H_{iR}$, from the $i^{th}$ subscriber station's perspective), such as in a frequency division duplex (FDD) system. With the assembled or estimated MIMO channel matrix information $H_i$ from all subscriber stations, the base station 302 uses the vector design module 310 to jointly design the combining vector $v_i$ and weighting $w_i$ for each subscriber station 302.1-m. In at least one embodiment, the collaborative determination of the weighting vector $w_i$ and combining vector $v_i$ for each subscriber station 304i exploits the instantaneous channel conditions by ranking the MIMO channel matrix information $H_1$-$H_m$ to increase the average SNR for each user. Once determined, the vectors $v_i$ are fed forward to the respective subscriber stations. The feed forward channels can also use the codebooks to efficiently convey control information, thereby reducing overhead for the system. For example, the codebook 312 at the transmitter/base station may be used to store an indexed set of possible vectors $v_i$ so that, instead of transmitting the complete vector information $v_1$, the transmitter 302 retrieves the corresponding index from the codebook 312 and feeds forward the index to the receiver (e.g., 304.1) which uses the index to access the corresponding vector $v_i$ information from the receiver codebook (e.g., 306.1).

Figure 4:
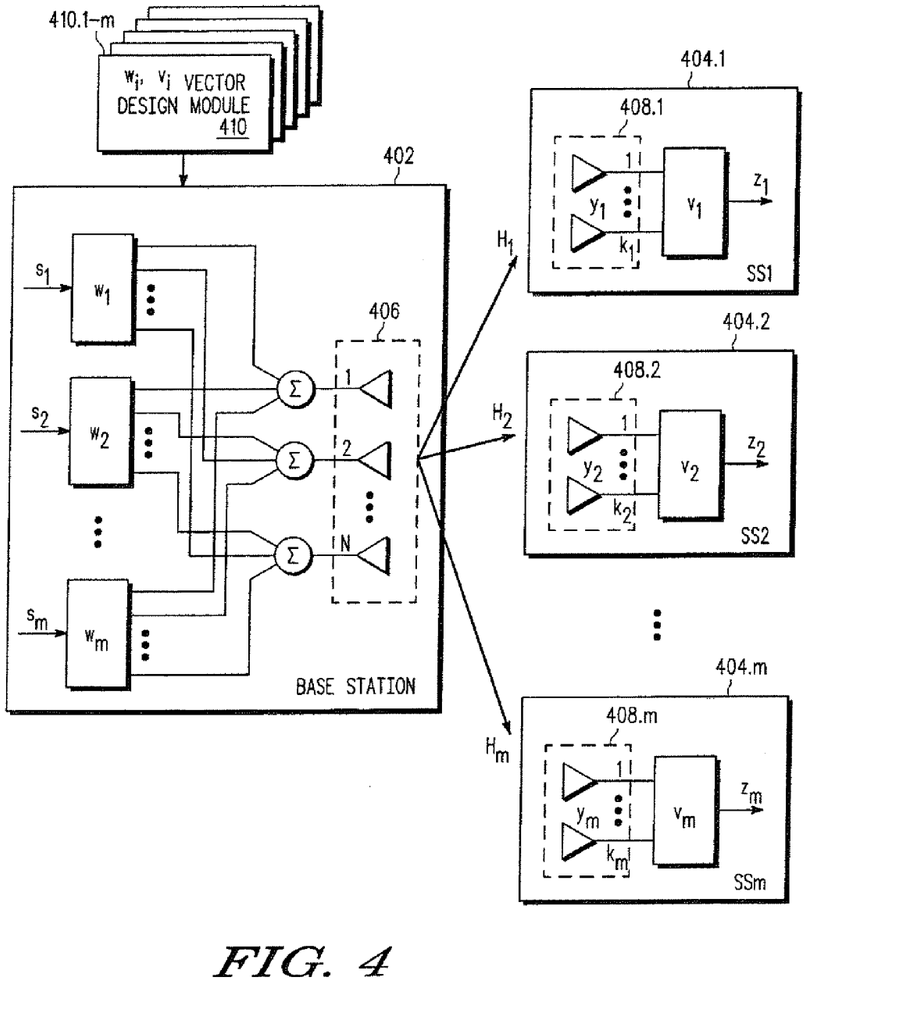
FIG. 4 depicts an embodiment of the wireless communication system in FIG. 3.

FIG. 4 depicts an embodiment of the wireless communication system 300 in more detail. The wireless communication system 400 includes a base station 402 with an antenna array 406 of N antennas. The wireless communication system 400 also includes m different subscriber stations 404.1 through 404.m, each with an antenna array 408.1 through 408.m. The number of antennas in each subscriber station antenna array can vary between subscriber stations. The MIMO channel from the base station 402 to the $i^{th}$ subscriber station 404.i is denoted by $H_i$, $i \in \{1, 2, \ldots, m\}$. The channel matrix $H_i$ is an N×$k_i$ matrix of complex entries representing the complex coefficients of the transmission channel between each transmit-receive antenna pair, where N represents the number of base station 402 antennas, and $k_i$ represents the number of antennas of the $i^{th}$ subscriber station. In operation, a data signal $s_1$ presented at the base station 402 for transmission to the subscriber station 404.1 is transformed into a transmission signal, represented by the vector $x_1$ in accordance with equation $x_1 = w_1 \cdot s_1$. At the receiver subscriber station 404.1, the received signal for user 1 is $y_1 = *_1 H_1 x_1$, where $H_1$ is the MIMO channel matrix of dimension N×m, $y_1$ is the k×1 receive vector at the antenna array 408.1 of the subscriber station 404.1; and k is the number of receive antennas at the subscriber station 404.1. To determine $z_1$ (the estimate for $s_1$), the receiver subscriber station 404.1 computes $z_1 = v_1^H y_1$, where $v_1$ is the combining vector for the subscriber station 404.1.

A collaborative SDMA-MIMO communication process between base station 402 and subscriber stations 404.1 through 404.m can be conceptually separated into an uplink process and a downlink process. In a downlink process, the base station 402 is the transmitter, N equals the number of antennas used for transmitting on the base station 402, and $k_i$ represents the number of antennas of the $i^{th}$ subscriber station 404.i used to receive the transmitted signal. In an uplink process, the subscriber station 404.i is the transmitter, and the base station 402 is the receiver. In an example downlink process, each subscriber station 404.i determines its channel matrix information $H_i$ and provides it through feedback to the base station 402. Alternatively, the base station 402 may estimate the channel matrix information for each subscriber station 404.1 to 404.m. With the assembled channel matrix information from each subscriber, the vector design module 410 jointly determines, for each subscriber station 404i, a beamforming weighting vector $w_i$ (for weighting the signal transmitted by the N antennas of the base station 402) and a combining vector $v_i$ (for combining the signals received by each of the $k_i$ antennas of subscriber station 404.i). In at least one embodiment, base station 402 and each of subscriber stations 404.1-404.m include a processor, software executed by the processor, and other hardware that allow the processes used for communication and any other functions performed by base station 402 and each of subscriber stations 404.1-404.m. As will be appreciated, the uplink channel and the downlink channel may be the same or different depending upon the choice of communication scheme. For example, the uplink and downlink channels are the same for time division duplex (TDD) communication schemes and different for frequency division duplex (FDD) schemes.

Figure 5:
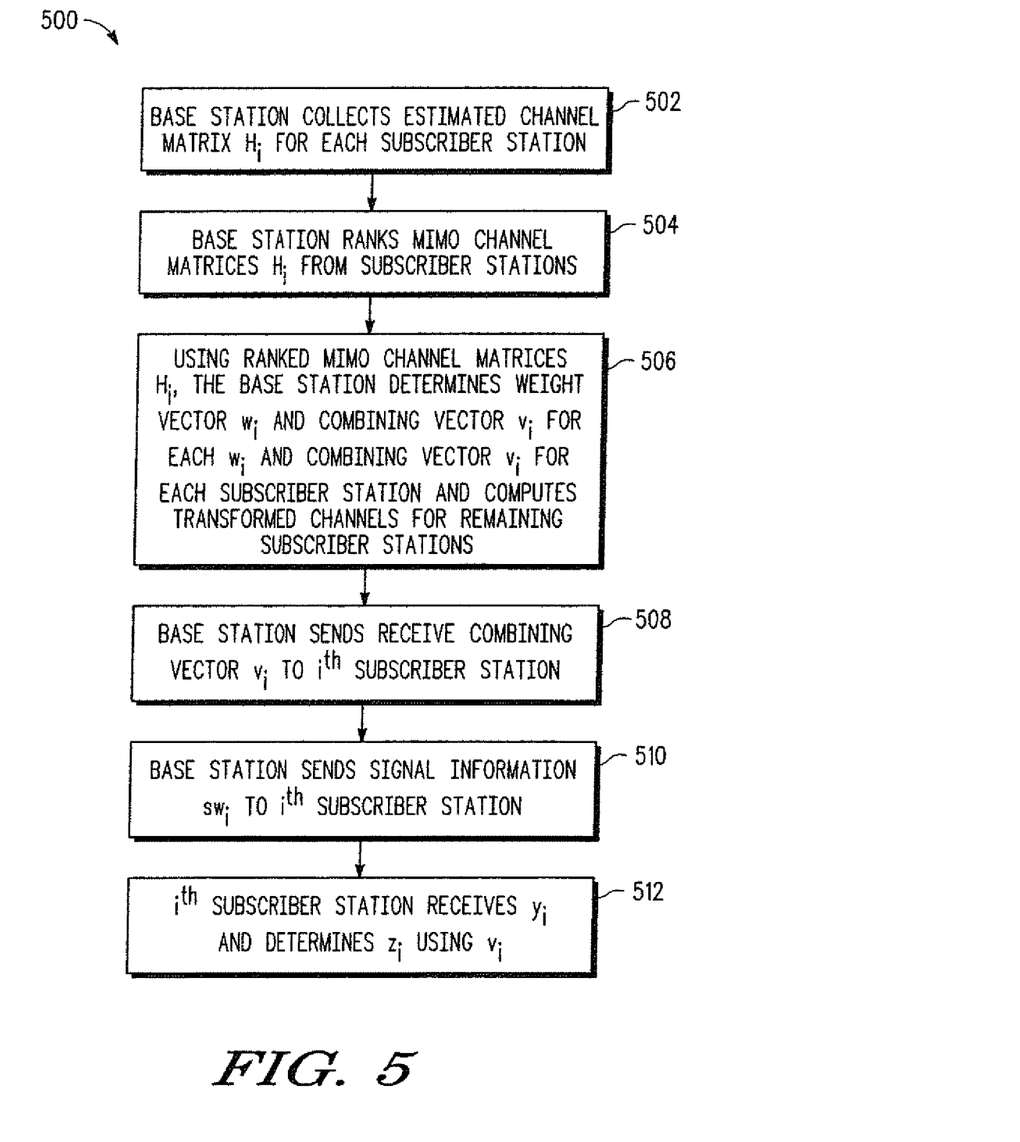
FIG. 5 depicts a collaborative SDMA-MIMO downlink communication process.

FIG. 5 depicts a collaborative SDMA-MIMO downlink communication process 500 that represents one embodiment of a downlink communication process between base station 402 and subscriber stations 404.1 through 404.m. Referring to FIGS. 4 and 5, in operation 502, the base station 402 collects estimated channel matrices $\hat{H}_1$ through $\hat{H}_m$ from each subscriber station 404.1-404.m. With FDD systems, this may be accomplished by transmitting a pilot signal from the base station 402 to the subscriber stations 404.1-404.m, each of which uses a pilot-based channel estimation technique to respectively estimate channel matrices $\hat{H}_1$ through $\hat{H}_m$, where the "^" symbol indicates an estimated value. Pilot-based channel estimation techniques are well-known in the art. The estimated channel matrix information $H_i$ from each subscriber station 404.i is then fed back to the base station 402. As will be appreciated, the base station 402 may instead use other channel estimation techniques (such as sounding mechanisms) to estimate the respective estimated channel matrices $H_i$. For example, with TDD systems where the transmit and receive channels are reciprocal, each of the subscriber stations 404.1-404.m may transmit a pilot signal to the base station 402, which uses a pilot-based channel estimation technique to respectively estimate channel matrices $\hat{H}_1$ through $\hat{H}_m$, where the "^" symbol indicates an estimated value.

In operation 504, the assembled channel matrix information $H_i$ for the subscriber stations 404.1-m are ranked or sorted for subsequent processing on the basis of the instantaneous channel conditions to determine the weighting and combining vectors (at step 506). In accordance with a first illustrative embodiment which may be used when the number of subscriber stations m is less than or equal to the number of antennas $k_i$ at each subscriber station 404.i, the MIMO channel matrices $H_i$ are ranked to identify the top-ranked subscriber station 404.$k$ (step 504). While any desired channel ranking technique may be used, the MIMO channel matrices $H_i$ may be ranked on the basis of the highest singular values for all the channel matrices $H_i$ (e.g., $\lambda_i = SL_{max}(H_i)$) to identify the top-ranked subscriber station 404.$k$. Other equivalent techniques may also be used to select the top-ranked subscriber station 404.$k$, such as by ranking the channel matrices $H_i$ on the basis of the maximal eigenvalue so that the top-ranked subscriber station 404.$k$ (or $SS_{404.k}$) is $$SS_{404,k} = \operatorname*{argmax}_{i \in U} ev_{max}(H_i^H H_i),$$

where $U=\{1, 2, 3, \ldots, m\}$.

At step 506, the weighting vector $w_k$ for the top-ranked subscriber station 404.$k$ may be computed to correspond to the maximal left singular vector corresponding to the maximal eigenvalue of the estimated channel matrix $H_k$ while the combining vector $v_k$ for the top-ranked subscriber station 404.$k$ may be computed to correspond to the right singular vector corresponding to the maximal eigenvalue of the estimated channel matrix $H_k$. Once processed, the top-ranked subscriber station 404.$k$ is removed from the pool of subscriber stations, at which point transformed channel matrix values $H_i$ are computed for the remaining subscriber stations in the pool of subscriber stations, and the process is repeated to rank and process the remaining subscriber stations. For example, the channels to the remaining subscriber stations may be transformed or updated by projecting the remaining channels onto the nullspace of the top-ranked subscriber station 404.$k$, followed by ranking the transformed channels to select the next-best subscriber station 404.$j$ using the equation $$SS_{404,j} = \operatorname*{argmax}_{i \in E} SL_{max}(T_t T_t^H H_i T_r T_r^H)$$

where E is the set of all users except user 404.$k$, and $T_t$ and $T_r$ are the nullspaces corresponding to $H_k^H w_k$ and $H_k v_k$, respectively. For the selected "next best" subscriber station 404.$j$, the weighting and combining vectors $w_j$, $v_j$ as the left and right singular vectors, respectively, of the transformed MIMO channel matrix $H_j$, and so on. In this way, the processing at step 506 is repeated to select the next "best" subscriber station until all the subscriber stations are processed and the beamformers to all subscriber stations are designed.

An illustrative example of the ranking and processing steps 504, 506 that may be used if the number MI of subscriber stations 404.1-$m$ is less than or equal to the number of antennas $k_i$ at each subscriber stations 404.$i$ is set forth in the full nullspace method below:

```
> U = {1,2,3,...,m}; S = { };
> for n = 1:m
    > Compute highest singular values of all H_i, λ_i = SL_max(H_i) for all i ∈
      U-S where SL_max (.) is the maximal eigenvalue of matrix (.)
    > Choose user k = arg max_i λ_i, and pick w_k = LSV_max(H_k) and v_k =
      RSV_max(H_k), where LSV_max (.) and RSV_max (.) are maximal left
      and right singular vectors corresponding to λ_k.
    > Add k to S.
    > Compute transformed channels for users i ∈ U-S : H_i =
      T_t T_t^H H_i T_r T_r^H, where T_t = null({H_k v_k}) and T_r = null({H_k^H w_k})
      where k ∈ S
> end.
```

As will be appreciated, other approaches may be used at steps 504, 506 to rank and process the assembled channel matrix information $H_i$ for purposes of designing array vectors that will exploit the instantaneous channel conditions. For example, another example of a full nullspace methodology is depicted with the pseudo-code given below:

Step 1: Initialize:

$U=\{1,2,\ldots,m\}, S=\{\ \}, E=U$ $X_t=[\ ], X_r=[\ ]$ $\tilde{H}_i = H_i, \forall i \in U$ Step 2: Select best subscriber station $\tilde{u}$:

$\tilde{u} = \operatorname*{argmax}_{i \in E} SL_{max}(\tilde{H}_i)$

Step 3: Design transmit and receive beamformers for best subscriber station:

$w_{\tilde{u}} = LSV_{max}(\tilde{H}_{\tilde{u}})$ $v_{\tilde{u}} = RSV_{max}(\tilde{H}_{\tilde{u}})$ Step 4: Update $S=S \cup \{\tilde{u}\}, E=U \setminus S$ $X_t=[X_t, H_{\tilde{u}} v_{\tilde{u}}]$ $X_r=[X_r, H_{\tilde{u}} w_{\tilde{u}}]$ $T_t = \operatorname{null}(X_r), T_r = \operatorname{null}(X_t)$ $\tilde{H}_i = T_t T_t^H H_i T_r T_r^H, \forall i \in E$ Step 5: If $|S|=m$, exit; otherwise, go to Step 2.

In accordance with various alternative embodiments of the invention, a nullspace-subspace methodology may be used at steps 504 and 506 to rank the channel matrices and design the corresponding beamforming vectors when the number of subscriber stations m is greater than the number of antennas $k_i$ at each subscriber station 404.$i$. This methodology may be applied when one or more of the m substations have k receive antennas, where k<m. With this methodology, the MIMO channel matrices $H_1$ are ranked and divided into two sets, S and P. Where $\bar{k}$ is the minimum receive antenna count (e.g., $\bar{k} = \min_{i \in U} k_i$), the primary set P contains the $\bar{k}$ subscriber stations having the highest $\bar{k}$-ranked channel matrices, while the secondary set S contains the m–$\bar{k}$ remaining subscriber stations having the lowest ranked channel matrices. Once the subscriber stations are divided into the S and P sets, the combining vectors $v_s$ for the subscriber stations corresponding to the secondary set S are designed to the right singular vectors of their respective channel matrices (e.g., $v_s = RSV_{max}(H_s)$, $\forall s \in S$). Next, the channels of all subscriber stations in the primary set P are transformed by projecting these channels onto the null-space corresponding to the combining vectors $v_s$ in the secondary set S. Next, the array vectors $w_p$, $v_p$ for the primary set P are computed based on the ranking of the channel matrices in the primary set P using the full nullspace method substantially as described above. Finally, the weighting vectors $w_s$ for the secondary set S are computed after computing the transformation of the channel matrices in the secondary set S, such as by using a linearly constrained minimum variance algorithm.

An illustrative example of the nullspace-subspace method for ranking and processing steps 504, 506 when the number m of subscriber stations 404.1-$m$ is greater than to the number of antennas $k_i$ at each subscriber stations 404.$i$ is set forth below:

---
> $U = \{1, 2, 3, \ldots, m\}$
> Compute highest singular values of all $H_i$, $\lambda_i = SL_{max}(H_i)$ for all $i \in U$ where $SL_{max}(.)$ is the maximal eigenvalue of matrix $(.)$
> Let $\lambda_1 \leq \lambda_2 \leq \lambda_3 \leq \ldots \leq \lambda_m$
> $S = \{\lambda_1, \lambda_2, \ldots, \lambda_{m-k_i}\}$ and $P = \{\lambda_{m-k_i}+1, \lambda_{m-k_i}+2, \ldots, \lambda_m\}$
> $v_k = RSV_{max}(H_k)$ for all $k \in S$ and $T_1 = \text{null}(\{H_k v_k; \text{ for all } k \in S\})$
> Set $H_i = T_1 T_1^H H_i$ for all $i \in P$
> Use full nullspace method for computing $v_i$ and $w_i$ for all $i \in P$
> $T_2 = \text{null}(\{H_i v_i \text{ for all } i \in P\})$
> For all $k \in S$
>> Set $\underline{H}_k = T_2 T_2^H H_k$ and $X = [\underline{H}_1 v_1, \underline{H}_2 v_2, \underline{H}_{m-k_i} v_{m-k_i}]$ for all $k \in S$
>> $w_k = X[X^H X]^{-1} e_k$ where $e_k$ is a vector of all zeros except for 1 at the $k^{th}$ position
> end.
---

As will be appreciated, other approaches may be used at steps 504, 506 for implementing a nullspace-subspace methodology to rank and process the assembled channel matrix information $H_i$ corresponding to the subscriber station users $u_1, u_2, \ldots u_m$. An example of another approach for the nullspace-subspace methodology is depicted with the pseudo-code given below:

Step 1: Initialize:

$$U = \{1, 2, \ldots, m\}, \quad \tilde{k} = \min_{i \in U} k_i$$

Step 2: Rank users $u_1, u_2, \ldots u_m$:

$$SL_{max}(H_{u_1}) \geq SL_{max}(H_{u_2}) \geq \ldots \geq SL_{max}(H_{u_m})$$

Step 3: Form primary and secondary groups:

$$P = \{u_1, u_2, \ldots, u_{\tilde{k}}\}, S = \{u_{\tilde{k}+1}, u_{\tilde{k}+2}, \ldots, u_m\}$$

Step 4: Design receive beamformers for S:

$$v_i = RSV_{max}(H_i), \forall i \in S$$

Step 5: Transform primary channels:

$$T_1 = \text{null}(\{H_i v_i : \forall i \in S\})$$

$$\tilde{H}_j = T_1 T_1^H H_j, \forall j \in P$$

Step 6: Designs beamformers for P:

Using $\tilde{H}_j$ design $w_j$ and $v_j$ for all $j \in P$.

Step 7: Transform secondary channels:

$$T_2 = \text{null}(\{H_j v_j : \forall j \in P\})$$

$$\tilde{H}_i = T_2 T_2^H H_i, \forall i \in S$$

Step 8: Design transmit beamformers for S:

$$X = [\tilde{H}_{u_{\tilde{k}+1}} v_{u_{\tilde{k}+1}} \tilde{H}_{u_{\tilde{k}+2}} v_{u_{\tilde{k}+2}} \ldots \tilde{H}_{u_m} v_{u_m}]$$

$$w_i = \{X[X^H X]^{-1}\}_i$$

where $\{Y\}_i$ refers to the $i^{th}$ column of matrix $Y$.

As described herein, the base station vector design module computes the vectors $(v_1, \ldots, v_m; w_1, \ldots, w_m)$ by ranking the channel matrix information $H_i$ to opportunistically exploit channel conditions to different users in order to best make use of the existing channel conditions to different users. A variety of design algorithms may be used to design opportunistic beamforming vectors using sequential nullspace methods (SNSM) that provide performance benefits with minimal computational complexity. The SNSM algorithms are based on sequential design of transmit-receive beamformers. Among the scheduled subscriber stations, beamformers for the best subscriber station are designed first, ensuring full beamforming gain to the best subscriber station. Beamformers to the second "best" subscriber station are then designed within the null-space of the first subscriber station, and so on. These algorithms include a full nullspace (FN) method and a nullspace-subspace (NS) method.

In operation 508, once the weight vector $w_i$ and a complementary combining vector $v_i$ are determined, the base station 402 transmits the combining vector $v_1$ information to the subscriber station 404.$i$ that allows the subscriber station 404.$i$ receive and combine signals intended for the subscriber station 404.$i$. In addition or at a later time, the base station 402 transmits up to m different signals to the in subscriber stations 404.1-404.$m$ on the same time-frequency channel at operation 510. The modulated data to be transmitted to subscriber station 404.1 is denoted by $s_i$. Each of the m signals $s_1$ through $s_m$ are transmitted through all the N antennas 406 at base station 402 using unique complex antenna weights $w_1$ through $w_m$, respectively. In at least one embodiment, the actual signal transmitted on each base station 402 antenna is a superposition of vectors $x_1$ through $x_m$, where $x_i = s_i w_i$ and $i \in \{1, 2, \ldots, m\}$.

In operation 512, the subscriber station 404.1 having $k_1$ antennas in antenna array 406.1 receives signal vector $y_1$. In at least one embodiment, for subscribers station 404.1, signal vector $y_1$ is defined by Equation [4]:

$$y_1 = s_1 \hat{H}_1^H w_1 + \sum_{i=2}^{m} s_i \hat{H}_i^H w_i + n \quad [4]$$

where "$s_1$" is the data to be transmitted to subscriber station 404.1, "$\hat{H}_1^H$" represents the complex conjugate of the estimated channel matrix $\hat{H}_1$, $w_i$ is the $i^{th}$ beamforming, N dimensional weighting vector, and the vector n represents external noise interference for $i \in \{1, 2, \ldots, m\}$. The superscript "H" is used herein to represent a complex conjugate operator. The $j^{th}$ element of the received signal vector $y_i$ represents the signal received on the $j^{th}$ antenna of subscriber station 404.$i$, $j \in \{1, 2, \ldots, k\}$. Equation [4] can be used for all $y_i$ by letting the first term on the right hand side of Equation [4] be the desired receive signal while the summation terms represent co-channel interference. The subscriber station 404.$i$ then weights and sums the receive signal vector $y_i$ using the combining vector $v_i$ (determined jointly with the weighting vector $w_i$ by base station 402) to determine the desired output data signal $z_i$, which is an estimate of the transmitted data signal $s_i$, in accordance with Equation [5]:

$$z_i = \hat{s}_i = v_i^H y_i \quad [5]$$

While the description provided herein is with reference to a downlink system, it will be appreciated that the described algorithms can be extended to apply to the uplink communication process too.

Figure 6:
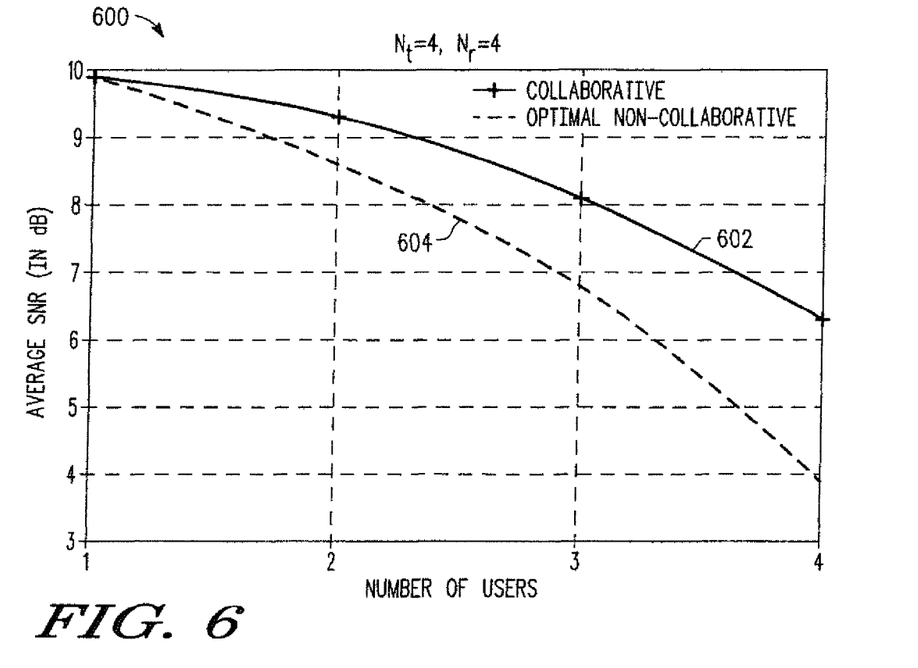
FIG. 6 depicts a simulated comparison of the wireless system in FIG. 4 and non-collaborative systems.

FIG. 6 depicts a simulated comparison 600 between an example non-collaborative process and a wireless communication system 400 using collaborative SDMA-MIMO communication process 500 where the number of subscriber station antennas is equal to maximum number of users and the full nullspace design methodology has been used to design the vector array. For the simulation, the number of base station transmit antennas N=4, and, for each subscriber station, the number of receive antennas k=4. The results are shown for a variable number of subscriber stations "m" on the x-axis. The curve 602 depicts the SNR achieved using a collaborative SDMA-MIMO communication process 500. The curve 604 depicts the SNR achieved using an example non-collaborative scheme. The curve 602 depicts a 2-3 dB gain in SNR over the non-collaborative scheme when transmitting to multiple subscriber stations.

Figure 7:
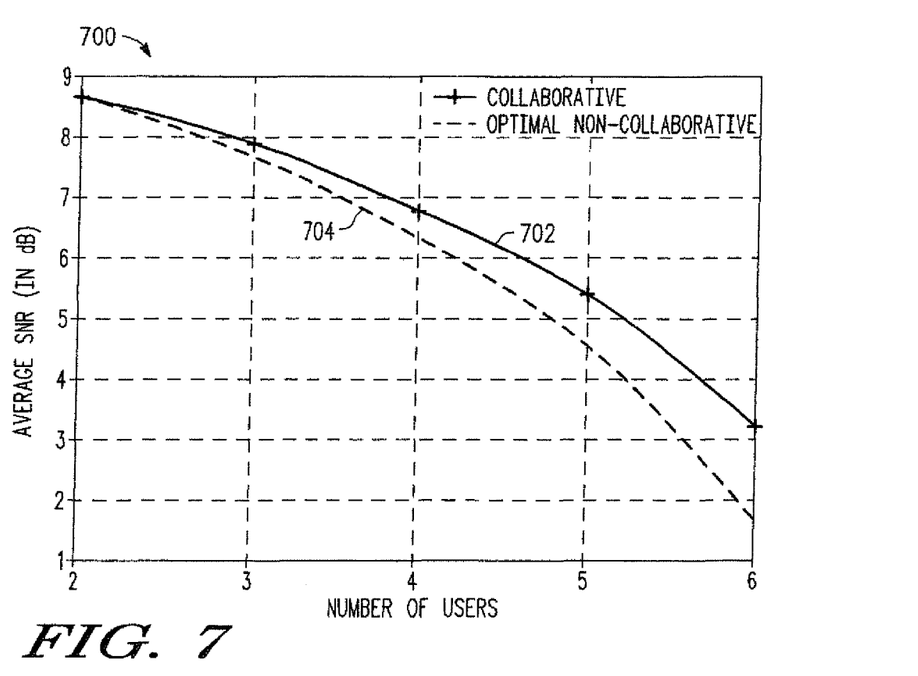
FIG. 7 depicts a simulated comparison of the wireless system in FIG. 4 and conventional systems in the presence of statistical interference.

FIG. 7 depicts a simulated comparison 700 between an example conventional non-collaborative process and a wireless communication system 400 using collaborative SDMA-MIMO communication process 500 where the number of subscriber station antennas is greater than the maximum number of users and the nullspace-subspace design methodology has been used to design the vector array. For the simulation, the number of base station transmit antennas N=6, and, for each subscriber station, the number of receive antennas k=2. The results are shown for a variable number of subscriber stations "m" on the x-axis. The curve 702 depicts the SNR achieved using a collaborative SDMA-MIMO communication process 500. The curve 704 depicts the SNR achieved using an example non-collaborative scheme. The curve 702 depicts a 1-2 dB gain in SNR over the conventional non-collaborative scheme when transmitting to multiple subscriber stations.

By now it should be appreciated that there has been provided a method and system for designing beamforming vectors for a collaborative space division multiple access system. In operation, a base station, using a vector design module or processor, assembles m channel matrices for m subscriber stations. In various embodiments, the channel matrices may be assembled by receiving over a feedback channel the estimated channel matrix H or an index representative of an estimated channel matrix H for a channel between the base station and a first subscriber station, where the index is used at the base station to access the estimated channel matrix H from a codebook for use in jointly design the beamforming vectors w and v. Once the in channel matrices are assembled, they are ranked by left singular value to select a top-ranked channel matrix H from the m channel matrices having the largest left singular value. Starting with the top-ranked channel matrix H, the base station jointly designs beamforming vectors w and v as left and right singular vectors, respectively, of the top-ranked channel matrix H. For example, the weighting vector w may be computed as the left singular vector corresponding to a maximal singular value of channel matrix H and the combining vector v may be computed as the right singular vector corresponding to a maximal singular value of channel matrix H. When beamforming vectors w and v for a selected channel matrix/subscriber station are computed, any non-selected channel matrices are transformed into a nullspace of the beamforming vectors w and v. The transformation may be implemented by computing transformed channel matrices for any non-selected channel matrices $H_i$ such that $H_i = T_t T_t^H H_i T_r T_r^H$, where $T_t = \text{null}(\{H \, v\})$ and $T_r = \text{null}(\{H^H w\})$. After selecting a next highest ranked channel matrix as the top-ranked channel matrix, the foregoing steps are repeated until beamforming vectors for all in channel matrices are designed. If any subscriber station has a receive antenna array with k antennas, where k<m, the process of jointly designing beamforming vectors starts by dividing the in channel matrices into a P set and an S set, where the P set contains k of the highest ranked subscriber stations and the S set contains all remaining subscriber stations. Next, the combining vectors $v_s$ for the S set are designed and the channel matrix information for the P set is transformed. Next, the weighting vectors $w_p$ and combining vectors $v_p$ for the P set are designed and the channel matrix information for the S set is transformed. Lastly, the weighting vectors $w_s$ for the S set are designed. Once the beamforming vectors w and v are designed for all subscriber stations, each beamforming vector v is transmitted to the corresponding subscriber station for use as a combining vector, though the beamforming vector v may also be used as a weighting vector. In addition, a weighting beamforming vector w may also be fed forward for use in uplink transmissions to the base station. This may be done by feeding forward the entire weighting or combining beamforming vector. Codebooks at the subscriber and base stations may also be used to send an index to the subscriber station that identifies a weighting or combining beamforming vector in the codebook, as described herein. Alternatively, the base station can feed forward an index representing the weighting/combining beamforming vector by extracting an ordered set of possible combining beamforming vectors for a given subscriber station from the channel matrix $\hat{H}_i$ for that subscriber station, and then transmitting an index identifying which of the set of possible weighting/combining beamforming vectors from the channel matrix $\hat{H}_i$ should be used as a weighting/combining vector at the corresponding subscriber station.

In another form, a base station is provided which has antennas for transmitting signals to in subscriber stations over in channels represented by a corresponding m channel matrices $(H_1, \ldots, H_m)$, respectively. The channel matrix information associated with each channel is collected at the base station, either directly as channel matrices or using codebooks to efficiently feed back channel estimate information by storing an indexed plurality of channel matrices, such that the base station receives over a feedback channel an index representative of an estimated channel matrix $H_i$ for a channel between the base station and subscriber station i, where the index is used at the base station to access the estimated channel matrix $H_i$ from a codebook for use in jointly design the beamformers w and v. The base station includes a module for jointly designing a pair of combining and weighting beamformers for each subscriber station in a set of unprocessed subscriber stations, where each subscriber station is ranked by left singular value of the channel matrix associated with subscriber station. The module may be implemented as a processor which is configured to select from the set of unprocessed subscriber stations a top-ranked subscriber station having an associated channel matrix $H_i$, and then jointly design a pair of combining and weighting beamformers $(v_i, w_i)$ for the top-ranked subscriber station by computing left and right singular vectors, respectively, of the channel matrix $H_i$ associated with the top-ranked subscriber station. After removing the top-ranked subscriber station from the set of unprocessed subscriber stations, transformed channel matrices are computed for all remaining subscriber stations in the set of unprocessed subscriber stations by projecting each channel matrix for the remaining subscriber stations onto a nullspace of the combining and weighting beamformers $(v_i, w_i)$. In situations where the number of subscriber stations exceeds the minimum receive antenna count k at any of the subscriber stations, the module may be configured to rank and divide the m subscriber stations into a P set (containing the k highest ranked subscriber stations) and an S set (containing the remaining subscriber stations). Once the subscriber stations are divided, the combining beamformers $v_s$ for the S set are designed (e.g., by computing, for each subscriber station in the S set, a right singular vector corresponding to a maximum singular value of a channel matrix between the base station and the subscriber station) and the channel matrix information for the P set is transformed, at which point the weighting beamformers $w_p$ and combining beamformers $v_p$ for the P set are designed from the ranked channel matrices for the subscriber stations in the P set and the channel matrices for the S set are transformed before the weighting beamformers $w_s$ for the S set are designed (e.g., by using a linearly constrained minimum variance process). The foregoing process is repeated until beamformers for all m channel matrices are designed, at which point the weighting or combining beamformers are transmitted to the corresponding subscriber stations. The weighting or combining vectors may then be fed forward to each subscriber station, either directly as matrix information or by using information representative of the vector, such as a codebook index corresponding to the vector that is used to access the vector from a codebook at the subscriber station. When the base station and subscriber station have shared access to channel matrix information $\hat{H}_i$, each designed combining beamformer (e.g., $v_i$) may be fed forward to its corresponding subscriber station (e.g., subscriber station i) by extracting an ordered set of possible combining vectors $v_i$ from the channel matrix $\hat{H}_i$ for a given subscriber station i, and then generating at the base station an index to identify which of the ordered set is the designed combining beamformer, and then feeding forward the index to the subscriber station i, which uses the index to access the combining beamforming $v_i$ from the channel matrix $\hat{H}_i$ for use as a combining beamformer at subscriber station i. A similar process may be used to feed forward the weighting beamformer to the subscriber station for use in uplink transmissions to the base station.

In yet another form, a wireless communication method and system are provided which use beamforming in a collaborative, multiple input, multiple output (MIMO) space division multiple access (SDMA) system. As disclosed, the methodology and system rank m subscriber stations by left singular value of a channel matrix associated with each subscriber station. Once the m subscriber stations are ranked, weighting beamformers w and combining beamformers v are designed for each of the subscriber stations by sequentially selecting, in descending order of rank, each subscriber station and computing therefore left and right singular vectors, respectively, from a channel matrix associated with the selected subscriber station, where any channel matrices associated with any non-selected subscriber stations are transformed onto a nullspace of the designed weighting beamformers w and combining beamformers v.

The methods and systems for providing opportunistic multi-user beamforming in a collaborative SDMA-MIMO system as shown and described herein may be implemented in hardware or in software stored on a computer-readable medium and executed as a computer program on a general purpose or special purpose computer to perform certain tasks. For a hardware implementation, the elements used to perform various signal processing steps at the base station (e.g., assembling and ranking channel matrix information, computing beamformer pairs, and so on) and/or at the subscriber station(s) (e.g., recovering the transmitted signals, demodulating and decoding the recovered signals, extracting or accessing beamformer information, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the base station and/or subscriber station(s) may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various collaborative MIMO-SDMA communication systems and methods for using same, the present invention is not necessarily limited to the example embodiments illustrate herein. For example, various embodiments of the collaborative MIMO-SDMA system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for designing beamforming vectors for a collaborative space division multiple access system, comprising:
   for each one of a plurality of subscriber stations, determining, by a processor, an array of channel conditions;
   wherein each one of the plurality of determined arrays comprises a representation of a plurality of channel gains corresponding to one or more transmit antennas and one or more receive antennas;
   ranking the plurality of determined arrays according to at least a first criterion; and
   designing a beamforming vector comprising a weighting vector and a combining vector for each subscriber station based at least in part on the ranking and on a nullspace of one or more previously designed weighting vectors and combining vectors of corresponding beamforming vectors;
   wherein, for each one of the plurality of determined arrays, the representation of the plurality of channel gains comprises a channel matrix H, wherein the first criterion is based at least in part on a maximal eigenvalue of the channel matrix H;
   wherein each beamforming vector for each subscriber station is determined sequentially according to rank.

2. The method of claim 1, wherein the first criterion is based at least in part on a best channel gain, the best channel gain being determined by identifying the matrix H corresponding to the subscriber station having the largest left singular value.

3. The method of claim 1, wherein the representation of the plurality of channel gains corresponding to the one or more transmit antennas and the one or more receive antennas is reported by the subscriber station.

4. The method of claim 3, wherein the representation of the plurality of channel gains is compressed using a codebook.

5. The method of claim 1, wherein the representation of the plurality of channel gains corresponding to the one or more transmit antennas and the one or more receive antennas is estimated by a base station.

6. A base station apparatus that determines beamforming vectors for a plurality of subscriber stations, comprising:
   an array of transmit and receive antennas;
   a processor; and
   a computer readable apparatus having a storage medium with at least one computer program stored thereon, the at least one computer program configured to, when executed on the processor:
      determine an array of channel conditions for each one of the plurality of subscriber stations, each one of the plurality of determined arrays comprising a representation of a plurality of channel gains between the array of transmit and receive antennas and the each one of the plurality of subscriber stations;
      rank the plurality of determined arrays according to a first criterion; and
      determine a beamforming vector comprising a weighting vector and a combining vector for each subscriber station, based at least in part on the ranking and on a nullspace of one or more previously determined weighting vectors and combining vectors weighting vectors and combining vectors of corresponding beamforming vectors;
   wherein the representation of the plurality of channel gains comprises a channel matrix H, wherein the first criterion is based at least in part on a maximal eigenvalue of the channel matrix H;
   wherein each beamforming vector for each subscriber station is determined sequentially according to rank.

7. The base station apparatus of claim 6, wherein the base station comprises a Multiple Input Multiple Output (MIMO) capable base station.

8. The base station apparatus of claim 6, wherein the first criterion is based at least in part on a best channel gain.

9. The base station apparatus of claim 6, wherein the beamforming vector for the highest ranked array is determined first.

10. The base station apparatus of claim 9, wherein the beamforming vector for the arrays are determined in order of rank.

* * * * *

UNITED STATES PATENT AND TRADEMARK OFFICE
CERTIFICATE OF CORRECTION

| | |
|---|---|
| PATENT NO. | : 9,172,444 B2 |
| APPLICATION NO. | : 13/311399 |
| DATED | : October 27, 2015 |
| INVENTOR(S) | : Jayakrishnan C. Mundarath et al. |

Page 1 of 1

It is certified that error appears in the above-identified patent and that said Letters Patent is hereby corrected as shown below:

In the claims:

Claim 6, Column 18, Lines 7-8, please delete "weighting vectors and combining vectors weighting vectors and combining vectors" and substitute -- weighting vectors and combining vectors --

Signed and Sealed this
Seventh Day of June, 2016

Michelle K. Lee
*Director of the United States Patent and Trademark Office*